United States Patent
Doppler et al.

(10) Patent No.: US 8,520,575 B2
(45) Date of Patent: Aug. 27, 2013

(54) ENABLING DEVICE-TO-DEVICE COMMUNICATION IN CELLULAR NETWORKS

(75) Inventors: Klaus Franz Doppler, Albany, CA (US); Timo Kalevi Koskela, Oulu (FI); Sami-Jukka Hakola, Kempele (FI); Cassio Barboza Ribeiro, Espoo (FI)

(73) Assignee: Nokia Corporation, Espoo (FI)

( * ) Notice: Subject to any disclaimer, the term of this patent is extended or adjusted under 35 U.S.C. 154(b) by 208 days.

(21) Appl. No.: 13/142,745

(22) PCT Filed: Jan. 12, 2010

(86) PCT No.: PCT/IB2010/000046
§ 371 (c)(1),
(2), (4) Date: Jun. 29, 2011

(87) PCT Pub. No.: WO2010/082114
PCT Pub. Date: Jul. 22, 2010

(65) Prior Publication Data
US 2011/0268004 A1 Nov. 3, 2011

Related U.S. Application Data

(60) Provisional application No. 61/145,157, filed on Jan. 16, 2009.

(51) Int. Cl.
*G08C 17/00* (2006.01)
*H04B 7/00* (2006.01)
*H04W 84/18* (2009.01)

(52) U.S. Cl.
CPC ..................................... *H04W 84/18* (2013.01)
USPC ........................... 370/310; 370/311; 455/450

(58) Field of Classification Search
USPC ......................................................... 370/311
See application file for complete search history.

(56) References Cited

U.S. PATENT DOCUMENTS

| | | | | |
|---|---|---|---|---|
| 2005/0239451 A1* | 10/2005 | Periyalwar et al. | ........... | 455/425 |
| 2009/0005057 A1* | 1/2009 | Lee et al. | ....................... | 455/450 |
| 2009/0011770 A1* | 1/2009 | Jung et al. | ................... | 455/452.1 |
| 2009/0215472 A1* | 8/2009 | Hsu | ................................ | 455/458 |
| 2010/0260093 A1* | 10/2010 | Liu et al. | ........................ | 370/315 |

FOREIGN PATENT DOCUMENTS

| | | |
|---|---|---|
| EP | 1909465 A1 | 4/2008 |
| EP | 2012443 A2 | 1/2009 |
| WO | WO2004103009 A1 | 11/2004 |

OTHER PUBLICATIONS

Brett Kaufman, et al., "Cellular Networks with an Overlaid Device to Device Network", Asilomar 2008, pp. 1537-1541.
Qi Zhang, et al., "Asymmetrical Modulation for Uplink Communication in Cooperative Networks", IEEE 2008, pp. 85-90.
International Search Report of PCT/IB2010/000046—Date of Completion of Search: Apr. 21, 2010, 4 pages.

* cited by examiner

Primary Examiner — Jason E Mattis
Assistant Examiner — Stephen J Clawson
(74) Attorney, Agent, or Firm — Locke Lord LLP

(57) ABSTRACT

According to one general aspect, a method may include communicating, by a first apparatus, with at least a second apparatus via a device-to-device communication link. In various embodiments, the method may also include receiving resource allocations, from a base station. In some embodiments, the method may include determining, based at least partly on the received resource allocations, which resources are allocated to at least the second apparatus for communication with the base station. In various embodiments, the method may include based at least partly upon the resource allocations, determining when to perform direct device-to-device communication, by the first apparatus, with the second apparatus.

21 Claims, 10 Drawing Sheets

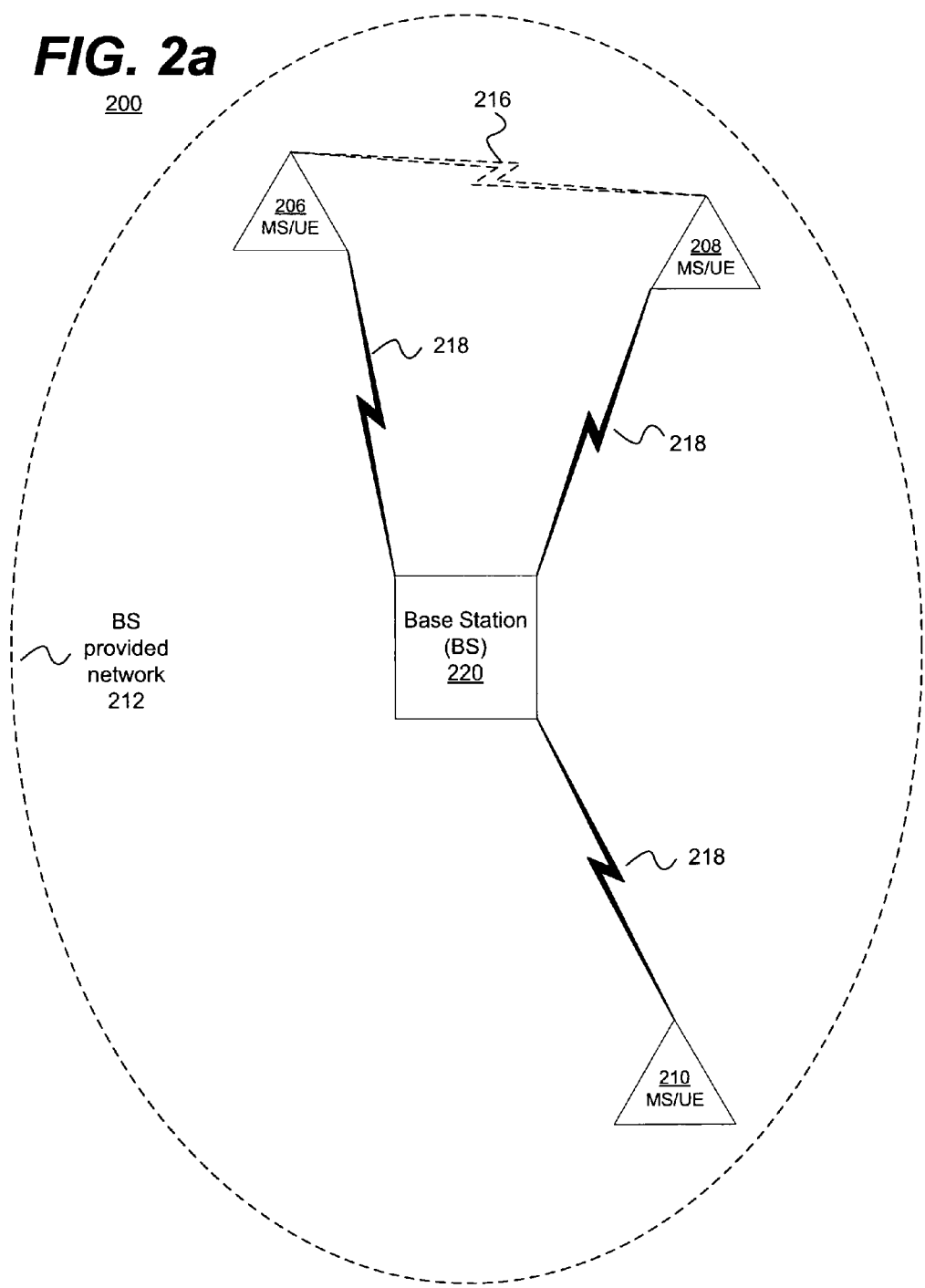

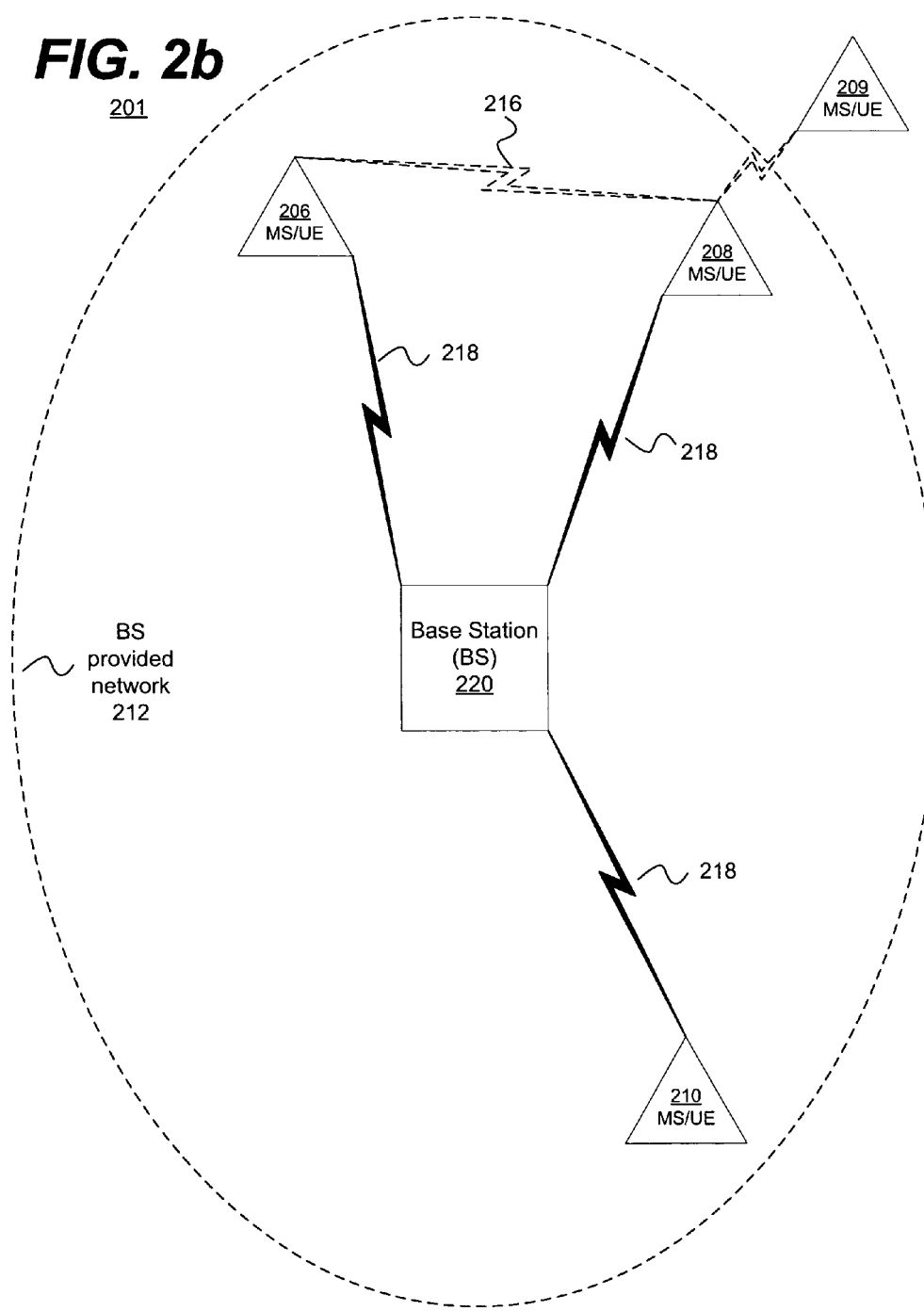

902 Communicating, by a first apparatus, with at least a second apparatus via a device-to-device communication link

↓

904 Employing, by the first apparatus, at least two discontinuous communication schemes to multiplex communicating with a first device-to-device cluster that includes both the first and second apparatuses and communicating with a second device-to-device cluster that includes the first apparatus and a third apparatus

↓

906 Receiving resource allocations, from a base station

↓

907 Determining, based at least partly on the received resource allocations, which resources are allocated to at least the second apparatus for communication with the base station

↓

908 Based at least partially upon the resource allocation, determining when to perform direct device-to-device communication, by the first apparatus, with the second apparatus

↓

910 Communicating, with the second apparatus, via at least a portion of the resources not allocated to the second apparatus by the base station

↓

912 Arranging a device-to-device transmission gap such that either the first apparatus or the second apparatus may communicate with the base station

ENABLING DEVICE-TO-DEVICE COMMUNICATION IN CELLULAR NETWORKS

TECHNICAL FIELD

This description relates to the communication of information, and more specifically to the communication of information between devices in a cellular network where direct device-to-device communication is allowed

BACKGROUND

Long Term Evolution (LTE) describes the latest standardization work by 3rd Generation Partnership Project (3GPP) in the area of mobile network technology. In preparation for further increasing user demands and tougher competition from new radio access technologies, LTE is generally being enhanced with a new radio access technique called LTE-Advanced. Via this technology LTE is expected to improve end-user throughput, increase sector capacity, reduce user plane latency, and consequently offer superior user experience with full mobility.

The Evolved UMTS Terrestrial Radio Access (E-UTRA) standard typically includes the air interface of 3GPP's LTE for mobile networks. An E-UTRA network or, as it is occasionally referred to, a LTE network includes a network that is substantially in compliance with the LTE standards, their derivatives, or predecessors (hereafter, "the LTE standard" or "Release 8 standard"). 3rd Generation Partnership Project, Technical Specification Group Radio Access Network; Evolved Universal Terrestrial Radio Access (E-UTRA); Physical Channels and Modulation (Release 8), 3GPP TS 36.211 V8.4.0 (2008-09), September 2008.

Worldwide Interoperability for Microwave Access (WiMAX) is a telecommunications technology often aimed at providing wireless data over long distances (e.g., kilometers) in a variety of ways, from point-to-point links to full mobile cellular type access. A network based upon WiMAX is occasionally also called a Wireless Metropolitan Access Network (WirelessMAN or WMAN); although, it is understood that WMANs may include protocols other than WiMAX. WiMAX often includes a network that is substantially in compliance with the IEEE 802.16 standards, their derivatives, or predecessors (hereafter, "the 802.16 standard"). Institute of Electrical and Electronics Engineers, IEEE Standard for Local and Metropolitan Area Networks, Part 16, IEEE Std. 802.16-2004.

One particular derivative of the 802.16 standard is the 802.16m standard that attempts to increase the data rate of wireless transmissions to 1 Gbps while maintaining backwards compatibility with older networks. IEEE 802.16 Broadband Wireless Access Working Group, IEEE 802.16m System Requirements, Oct. 19, 2007.

SUMMARY

According to one general aspect, a method may include communicating, by a first apparatus, with at least a second apparatus via a device-to-device communication link. In various embodiments, the method may also include receiving resource allocations, from a base station. In some embodiments, the method may include determining, based at least partly on the received resource allocations, which resources are allocated to at least the second apparatus for communication with the base station. In various embodiments, the method may include based at least partly upon the resource allocations, determining when to perform direct device-to-device communication, by the first apparatus, with the second apparatus.

According to another general aspect, an (first) apparatus may include a receiver, a transmitter, and a processor. In various embodiments, the receiver may be configured to receive signals from at least a second apparatus via a device-to-device communication link, and receive a resource allocations, from a base station. In some embodiments, the transmitter may be configured to transmit signals to at least the second apparatus via a device-to-device communication link. In one embodiment, the processor may be configured to determine, based at least partly on the received resource allocations, which resources are allocated to at least the second apparatus for communication with the base station, and determine, based at least partially upon the received resource allocations, when to perform direct device-to-device communication with the second apparatus.

According to another general aspect, a computer program product, comprising a computer usable medium having a computer readable program code embodied therein. In various embodiments, the computer readable program code may be adapted to be executed to implement a method for device-to-device communication. In some embodiments, the method may include communicating, by a first apparatus, with at least a second apparatus via a device-to-device communication link. In one embodiment, the method may also include receiving resource allocations, from a base station. In one embodiment, the method may include determining, based at least partly on the received resource allocations, which resources are allocated to at least the second apparatus for communication with the base station. In one embodiment, the method may include, based at least partly upon the resource allocations, determining when to perform direct device-to-device communication, by the first apparatus, with the second apparatus.

According to another general aspect, a chipset may include a receiver, a transmitter, and processor. In various embodiments, the receiver may be configured to receive signals, directed to a first apparatus from at least a second apparatus via a device-to-device communication link, and receive resource allocations, from a base station. In some embodiments, the transmitter may be configured to transmit signals, from the first apparatus to at least the second apparatus via a device-to-device communication link. In one embodiment, the processor may be configured to determine, based at least partly on the received resource allocations, which resources are allocated to at least the second apparatus for communication with the base station, and determine, based at least partially upon the received resource allocations, when to perform direct device-to-device communication between the first apparatus and the second apparatus.

The details of one or more implementations are set forth in the accompanying drawings and the description below. Other features will be apparent from the description and drawings, and from the claims.

A system and/or method for communicating information, substantially as shown in and/or described in connection with at least one of the figures, as set forth more completely in the claims.

BRIEF DESCRIPTION OF THE DRAWINGS

FIG. 2 are block diagrams of example embodiments of systems in accordance with the disclosed subject matter.

FIG. 9 is a flow chart of an example embodiment of a technique in accordance with the disclosed subject matter.

DETAILED DESCRIPTION

Figure 1:
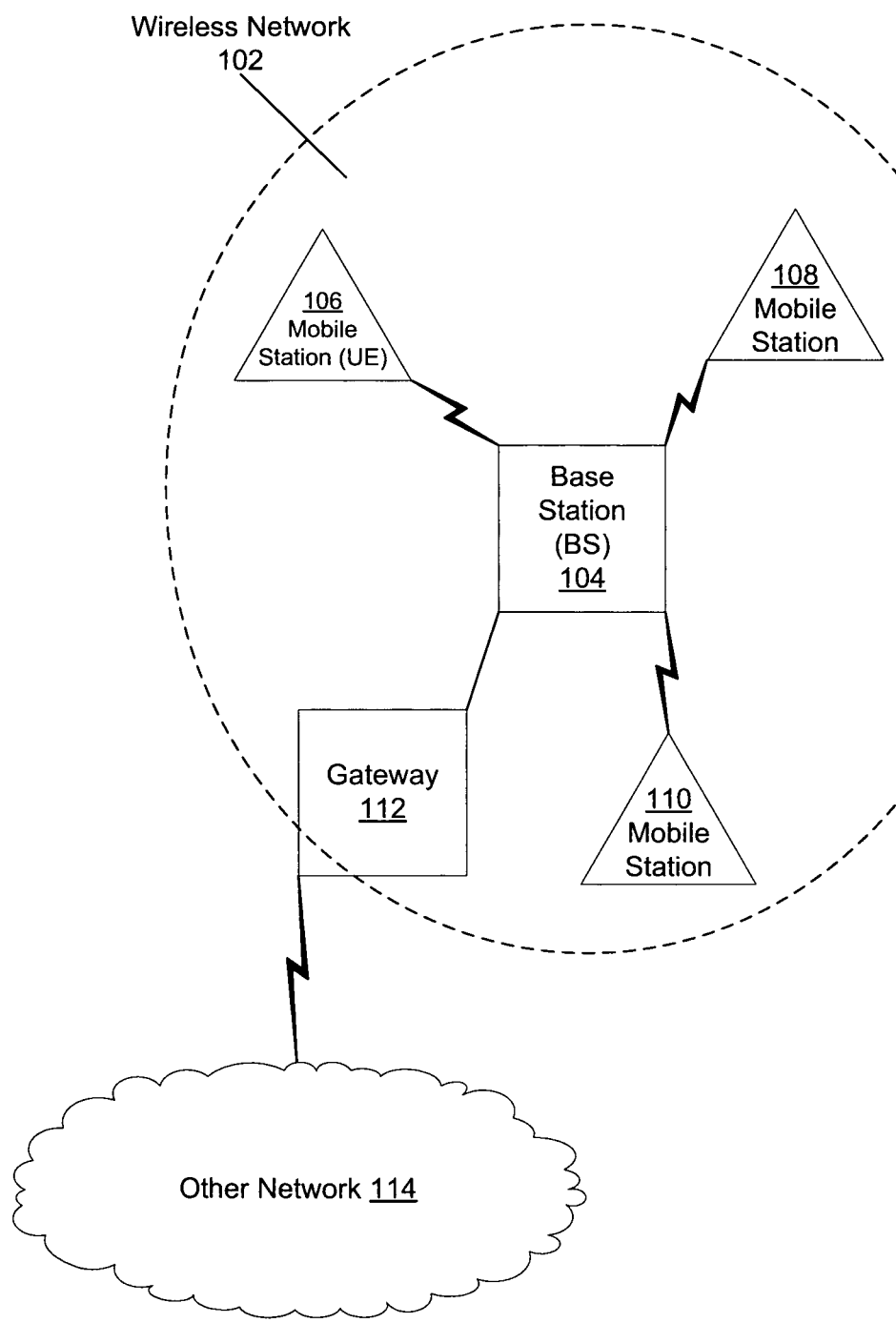
FIG. 1 is a block diagram of an example embodiment of a system in accordance with the disclosed subject matter.

Referring to the Figures in which like numerals indicate like elements, FIG. 1 is a block diagram of a wireless network 102 including an evolved Node Bs (eNBs) or base station (BS) 104 and user equipment (UE) or mobile stations (MSs) 106, 108, 110, according to an example embodiment. Each of the MSs 106, 108, 110 may be associated with BS 104, and may transmit data in an uplink (UL) direction to BS 104, and may receive data in a downlink (DL) direction from BS 104, for example. Although only one BS 104 and three mobile stations (MSs 106, 108 and 110) are shown, any number of base stations and mobile stations may be provided in network 102. Also, although not shown, mobile stations 106, 108 and 110 may be coupled to base station 104 via relay stations or relay nodes, for example. The base station 104 may be connected via wired or wireless links to another network (not shown), such as a Local Area Network (LAN), a Wide Area Network (WAN), the Internet, etc. In various embodiments, the base station 104 may be coupled or connected with the other network 120 via an access network controller (ASN) or gateway (GW) 112 that may control, monitor, or limit access to the other network.

FIG. 2 is block diagrams of example embodiments of systems 200 (FIG. 2a) and 201 (FIG. 2b) in accordance with the disclosed subject matter. In various embodiments, both systems 200 and 201 may include a plurality of MSs or UEs 206, 208, and 210, and a base station 220. In various embodiments, the BS 220 may provide a wireless network 212 within a given range. In various embodiments, the range of the wireless network may be determined by various factors, such as, the power output of the BS, the attenuation of the signals experience by physical objects in the environment (e.g., walls, trees, etc.), other interference, etc.; although, it is understood that the above are merely a few illustrative examples to which the disclosed subject matter is not limited.

FIG. 2a illustrates a system 200 in which two of the MSs, MSs 206 and 208, are in device-to-device (D2D) communication via link 216. In various embodiments, D2D communication may include transmitting and receiving information to/from a peer device without the aid or assistance of an access device or access node (e.g., a base station, relay station, etc.). In such an embodiment, two or more MSs may communicate with one another without significantly impacting communications between the BS 220 and other nodes (e.g., MS 210) in the system 200.

In some embodiments, D2D may include the use of the same communication channel as that used by the BS 220 generated network. In one embodiment, the D2D communication may operate at a lower power level than BS-MS communication. In such an embodiment, the D2D communication may not significantly cause interference with other communication (e.g., links 218) included by the system 200.

In one embodiment, the MSs engaged in D2D communication may select or designate a particular MS (e.g., MS 206) to act as a "pair head", "cluster head" or "master". In such an embodiment, the other MSs may operate as "slaves". In various embodiments, this head device may organize D2D communication between the MSs. In one embodiment, the slave devices may organize their D2D communication based upon queues provided by the head device. In the illustrated embodiment, D2D communication may include only two devices (MS 206 and MS 208). In such an embodiment, MS 206 may be the pair head device, while MS 208 may be the slave device.

In various embodiments, the D2D MSs 206 and 208 may occasionally communicate with the BS 220 via the respective access links 218. In some embodiments, this communication with the BS 220 may include ceasing or pausing D2D communication. In various embodiments, the organization and procedure for switching from D2D communication to access communication is discussed below. In various embodiments, the access communication may be referred to as "cellular" communication as the communication may occur via cellular frequencies or protocols (e.g., WiMAX, 3G, LTE, etc.); although, it is understood that the above are merely a few illustrative examples to which the disclosed subject matter is not limited.

FIG. 2b illustrates an embodiment that includes a system 201. In such an embodiment, the D2D communication network may include more than two MSs (e.g., MSs 206, 208 and 209). In various embodiments, one or more of the D2D MSs may be outside the range of the BS 220 provided network 212. In various embodiments, the MS 208 may act as a cluster head device, while the MSs 206 and 209 may act as slave devices. In some embodiments, the in-network MSs (MSs 206 and 208) may relay information to the BS 220 on behalf of the out-of-network MS 209. More often, in various embodiments, the out-of-network MS 209 may not be able to receive communications (e.g., resource allocations, discontinuous communication control information, etc.) broadcast by the BS 220 that are employed by the D2D devices to co-ordinate and organize their respective D2D and Access communications. In such an embodiment, one or more of the in-network MSs (MSs 206 and 208) may relay any such control information they receive (either in whole, in a filtered, or repackaged formats) to the out-of-network MS 209, as described below.

Figure 3:
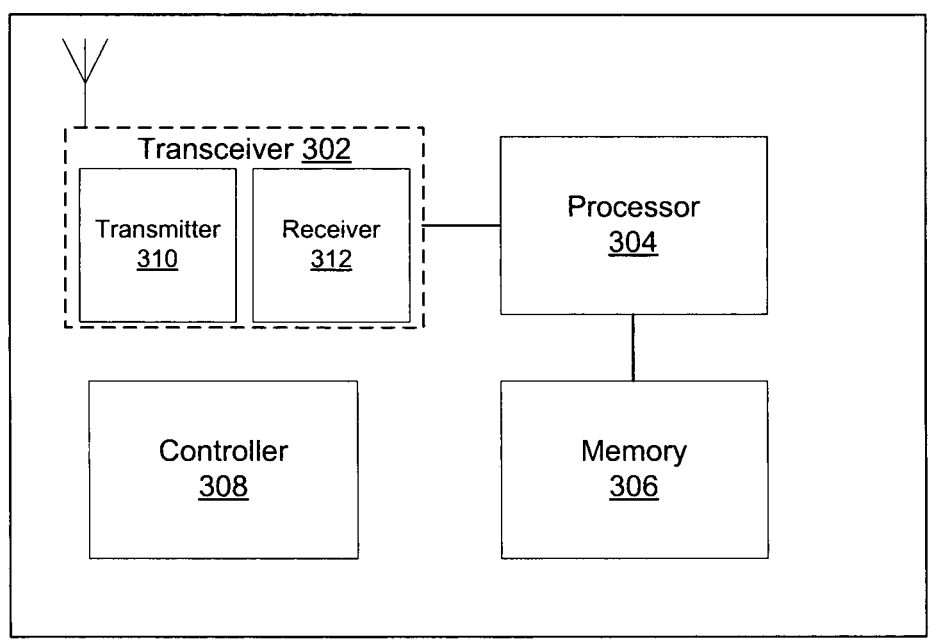
FIG. 3 is a block diagram of an example embodiment of a system in accordance with the disclosed subject matter.

FIG. 3 is a block diagram of an example embodiment of a system or apparatus 301 in accordance with the disclosed subject matter. The apparatus or station 301 (e.g., base station 220, user equipment 206, relay station 222, etc.) may include, for example, a transmitter 312 to transmit signals and/or a receiver 310 to receive signals. In various embodiments, the transmitter 312 and receiver 310 may be combined or included in a transceiver 302. In various embodiments, the apparatus 301 may also include a processor or baseband processor 304 to execute instructions or software and control transmission and receptions of signals, and a memory 306 to store data and/or instructions.

In some embodiments, the transceiver 302 may include an RF (radio frequency) or wireless transceiver 302. In such an embodiment, the wireless transceiver 302 may be configured to operate based upon a wireless networking standard (e.g., WiMAX, WiFi, WLAN, LTE, etc.). In another embodiment, the transceiver 302 may be configured to include a wired transceiver 302. In such an embodiment, the wired transceiver 302 may be configured to operate based upon a wired networking standard (e.g., Ethernet, optical, etc.).

Processor 304 may also make decisions or determinations, generate frames or messages for transmission, decode received frames or messages for further processing, and other tasks or functions described herein. Processor 304, which may be a baseband processor, for example, may generate messages, packets, frames or other signals for transmission. Processor 304 may control transmission of signals or messages over a wireless network, and may receive signals or messages, etc., via a wireless network (e.g., after being down-converted by wireless transceiver 302, for example). Processor 304 may be programmable and capable of executing software, firmware, or other instructions stored in memory or on other computer media to perform the various tasks and functions described herein, such as one or more of the tasks or methods described herein. Processor 304 may be (or may include), for example, hardware, programmable logic, a programmable processor that executes software or firmware, and/or any combination of these. Using other terminology, processor 304 and transceiver 302 together may be considered as a wireless transmitter/receiver system, for example.

In addition, a controller (or processor) 308 may execute software and instructions, and may provide overall control for the station 301, and may provide control for other systems not shown in FIG. 3, such as controlling input/output devices (e.g., display, keypad, etc.), and/or may execute software for one or more applications that may be provided on wireless station 301, such as, for example, an email program, audio/video applications, a word processor, a Voice over IP application, or other application or software.

In addition, a storage medium may be provided that includes stored instructions, which when executed by a controller or processor may result in the processor 304, or other controller or processor, performing one or more of the functions or tasks described herein.

Figure 4:
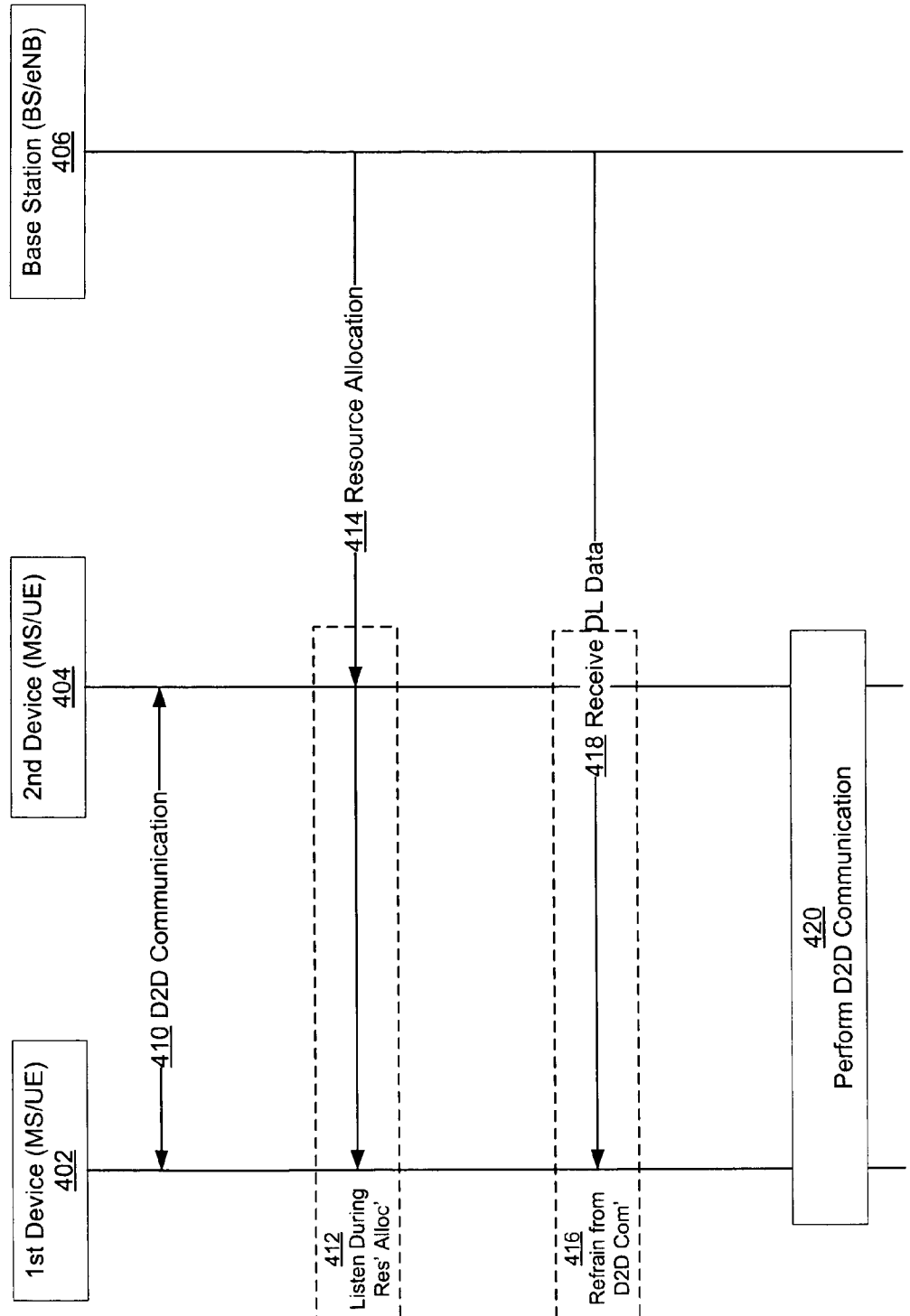
FIG. 4 is a block diagram of an example embodiment of a system in accordance with the disclosed subject matter.

FIG. 4 is a block diagram of an example embodiment of a system 400 in accordance with the disclosed subject matter. In one embodiment, the system 400 may include a first device (e.g., a MS, UE, etc.) 402, a second device (e.g., a MS, UE, etc.) 404, and a base station (e.g., a BS, a relay station, an eNB, etc.) 406. It is understood that while only two devices (devices 402 and 404) are illustrated, the disclosed subject matter is not limited to only two devices and a plurality of devices may be included in the system 400 or in the D2D communication network. Further, it is understood, that these devices may belong to more than one D2D network. In the illustrated embodiment, both MSs 402 and 404 may be within the communications range of and part of the wireless network provided by BS 406.

Action 410 illustrates that, in one embodiment, the MSs 402 and 404 may engage in wireless direct device-to-device (D2D) communication. In various embodiments, this may include transmitting data from the MS 402 to the MS 404 and vice versa. In some embodiments, action 410 may include placing one or both of the MSs 402 and 404 into an inactive or sleep mode or state with respect to the BS 406 and the cellular network thereof (e.g., via discontinuous transmission or discontinuous reception, etc.). However, in the illustrated embodiment, such a step is not necessary and is described in more detail in regards to other figures.

Action 412 illustrates that, in one embodiment, both the MS 402 and the 404 may listen to the resource allocation message or broadcast from the BS 406. In various embodiments, this listening may include halting or pausing any D2D communication between the two devices (MSs 402 and 404) and converting their respective transceivers to communicate not in a D2D mode, but in a cellular network mode. In such an embodiment, in cellular mode the devices (MS 402 and 404) may be configured to receive messages from the BS 406.

In various embodiments of a cellular network, the BS 406 may allocate communication resources (e.g., frequencies, time periods, symbols, etc.) throughout the network provided by the BS 406. In one such embodiment, the BS 406 may broadcast one or more control messages to any MSs within range informing them to whom the BS 406 is expecting to communicate and when/how this communication will occur. In one example embodiment, the BS 406 may have data to transmit to the MS 402 during a downlink (DL) sub-frame (or other resource block as determined by the networking standard employed by the cellular network).

In various embodiments, this resource allocation message 412 may be received and listened to by both the MS 402 and MS 404. In such an embodiment, both MSs 402 and 404 may know when the MS (MS 402 or 404) and the other MS (MS 404 or 402) will be in communication with the cellular network and unable to perform D2D communication.

In some embodiments, the two devices (MS 402 and 404) may transmit and receive various control messages (e.g., those discussed in FIG. 5, etc.) to coordinate a cessation or pausing of D2D communications, a D2D transmission or communication gap. However, in another embodiment, these control messages may not be used as each device may have been expected to listen to the resource allocation message 414, and take the appropriate action (e.g., refrain from transmitting during the cellular network transmission period).

Action 416 illustrates that, in one embodiment, that when the allocated (via message 414) cellular transmission of communication period with the effected device (e.g., MS 402) is scheduled to occur, the D2D cluster (e.g., MSs 402 and 404) may cease or refrain from performing D2D communication. In various embodiments involving more than two D2D devices, the D2D devices may only refrain from attempting to perform D2D communication with the allocated or effected device. For example, in a three device D2D cluster (not illustrated), if device #1 is allocated a resource block on the cellular network, devices #2 and #3 may continue to perform D2D communication and only refrain from D2D communication with device #1. Although, it is understood that the above is merely one illustrative example to which the disclosed subject matter is not limited.

In various embodiments, the BS 406 may transmit a DL message 418 to the MS 402 as scheduled via the resource allocation message 414 discussed above. In one embodiment, Action 422 illustrates that once the allocated resource period or block has occurred the MS 402 may switch back to a D2D mode and the two devices (MS 402 and 404) may resume their D2D communication. It is understood that the above merely represents a simple DL case and other communication cases (e.g., UL) are possible and within the scope of the disclosed subject matter.

Figure 5:
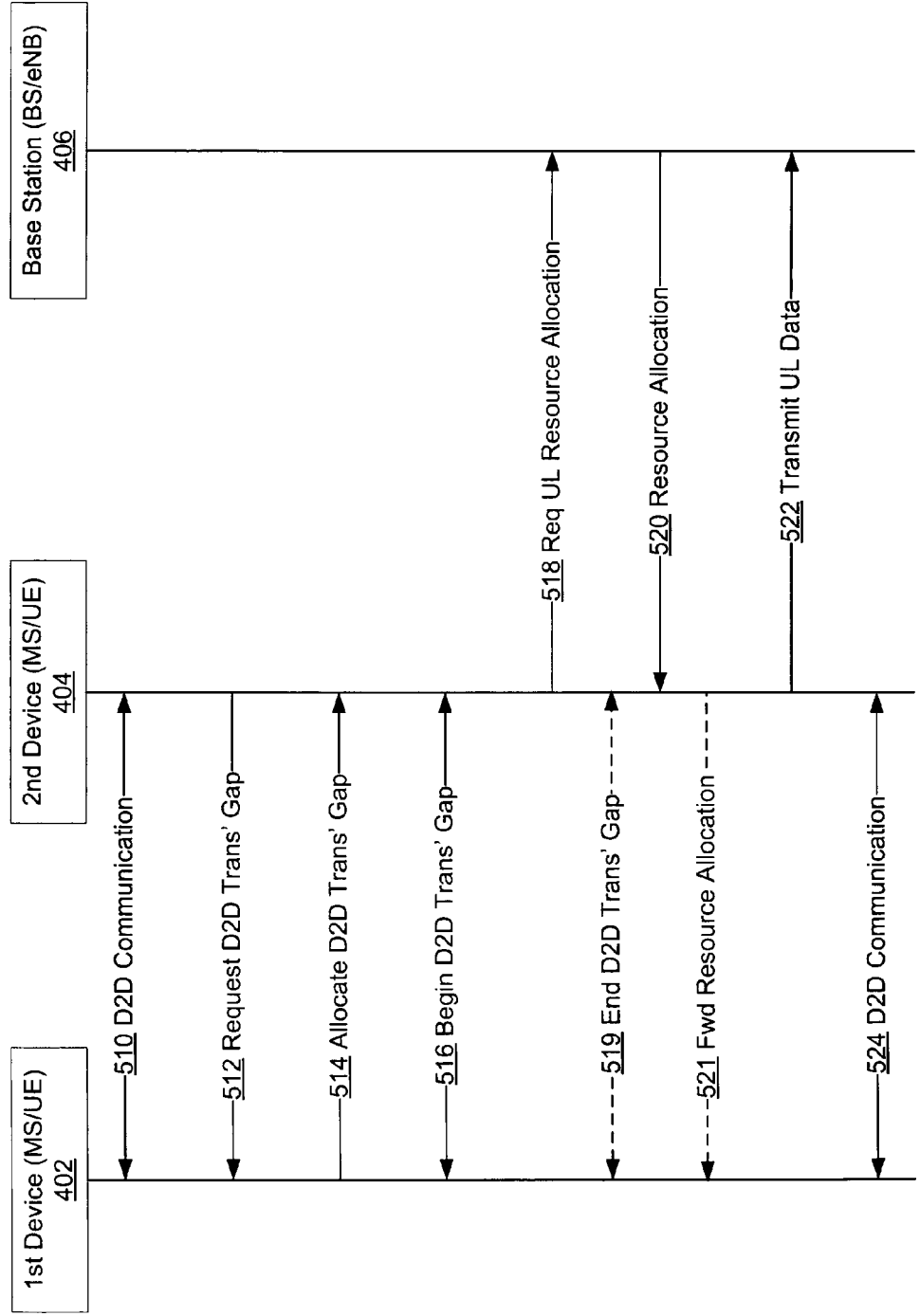
FIG. 5 is a block diagram of an example embodiment of a system in accordance with the disclosed subject matter.

FIG. 5 is a block diagram of an example embodiment of a system 500 in accordance with the disclosed subject matter. In one embodiment, the system 500 may include a first device (e.g., a MS, UE, etc.) 402, a second device (e.g., a MS, UE, etc.) 404, and a base station (e.g., a BS, a relay station, an eNB, etc.) 406. It is understood that while only two devices (devices 402 and 404) are illustrated, the disclosed subject matter is not limited to only two devices and a plurality of devices may be included in the system 400 or in the D2D communication network. Further, it is understood, that these devices may belong to more than one D2D network.

FIG. 5 illustrates a more complex case or embodiment than FIG. 4. Specifically, FIG. 5 illustrates an uplink (UL) transmission that is initiated by a MS (e.g., MS 404) as opposed to a DL transmission that is initiated by the BS 406. Furthermore, FIG. 5 illustrates an example in which one of the devices (e.g., MS 402) may be outside the range of the BS 406 and, therefore, unable to directly listen to the resource allocations transmitted by the BS 406. It is understood that the above are merely a few illustrative examples to which the disclosed subject matter is not limited.

Action 510 illustrates that, in one embodiment, the MSs 402 and 404 may engage in wireless direct device-to-device (D2D) communication. In various embodiments, this may include transmitting data from the MS 402 to the MS 404 and vice versa. In some embodiments, action 510 may include placing one or both of the MSs 402 and 404 into an inactive or sleep mode or state with respect to the BS 406 and the cellular network thereof (e.g., via a discontinous reception or discontinous transmission, etc.). However, in the illustrated embodiment, such a step is not necessary and is described in more detail in regards to other figures.

In one embodiment, one of the devices (e.g., MS 404) may wish or desire to communicate with the cellular network. For example, an uplink (UL) transmission of data may be desired. In such an embodiment, message 512 illustrates that the MS 404 may request that a D2D transmission gap occur. In various embodiments, the MS 404 may send a message to the MS 402 requesting or informing the MS 402 that the D2D transmission gap will occur. In some embodiments, this D2D transmission gap request message 512 may occur during a sub-frame scheduled for transmission of D2D data from MS 404.

In various embodiments, a D2D transmission gap may include a period of time (or radio frequency) in which no user data related D2D communication may occur with a device (e.g., MS 404). In such an embodiment, the affected MS (e.g., MS 404) may transition from communicating with the D2D network or cluster to communicating with the cellular network. In one embodiment, when the D2D network or cluster includes only two MSs (e.g., MSs 402 and 404), this may mean that all D2D communication cease for a period of time. In another embodiment, including a larger plurality of MSs, the D2D transmission gap may include only one MS ceasing D2D communication, while the other MSs continue to perform D2D communication with the knowledge that the affected MS will not hear or receive their messages.

In one embodiment, the pair or cluster head (e.g., MS 402) may transmit a D2D transmission gap allocation message 514 to the requesting device (e.g., MS 404). In various embodiments, the allocation message 514 may include information as to when and how (e.g., frequencies, with which device in the case of cluster's greater than two, etc.) the D2D transmission gap will occur. In various embodiments, this allocation message 514 may indicate that the D2D transmission gap is to occur with a regular period (e.g., every frame, etc.) or otherwise arrange a re-occurring D2D transmission gap. Action 516 illustrates that, in one embodiment, at the appointed or allocated time or frequency, the D2D transmission gap may begin.

In one embodiment, the MS 404 may transmit a UL resource request message 518 to the BS 406. In various embodiments, this resource request message 518 may include a request for the BS 406 to allocate UL resources to the MS 404. In various embodiments, the resource request message 518 may include a standard resource request as dictated by the networking standard employed by the BS 406 and the cellular network. In one embodiment, after the resource request message 518 has been sent, the D2D transmission gap period may end, as illustrated by Action 519. In another embodiment, the D2D transmission gap may continue until the MS 404 indicates the D2D transmission gap is no longer needed. In yet another embodiment, the cluster or pair head MS 402 may end (possibly temporarily) the D2D transmission gap based upon the state of communication between the MS 404 and the BS 406 (e.g., if no UL sub-frames will occur in the cellular network for awhile, if the BS 406 does not allocate UL resources to the MS 404 for the current frame, if the resource allocation sub-frame is occurring quickly and the D2D transmission gap may be extended to cover the resource allocation, etc.).

In various embodiments, the BS 406 may transmit a resource allocation message 520. In the illustrated embodiment, the resource allocation message 520 may include a UL resource allocation to allow the MS 404 to transmit data to the BS 406. In some embodiments, this resource allocation message 520 may be received by the MS 404. In one embodiment, the MS 402 may also receive the allocation message 520. In another embodiment, the MS 402 may be outside the range of the BS 406 or otherwise out of communication with the BS 406 (e.g., MS 406 may be associated with another BS, etc.). In such an embodiment, the MS 404 may forward the resource allocation message 520, in whole or part, to the MS 402 via message 521. In various embodiments, the MS 404 may re-package the allocation message 520 such that unnecessary information is not forwarded to the MS 402.

In various embodiments, the D2D transmission gap may extend to include the period in which the resource allocation message 520 is transmitted. In another embodiment, the D2D transmission gap may have previously ended but be re-instated in order to properly receive the resource allocation message 520. In another embodiment, as described above, a D2D transmission gap during the scheduled resource allocation message 520 may be the default behavior for the D2D MSs 402 and 404, and no extra signaling (e.g., messages 512 and 514) may be needed to quiet D2D transmission such that the resource allocation message 520 may be heard or received by the MSs.

In various embodiments, the MS 404 may transmit a UL data message 522 to the BS 406 during its allocated resource block. In such an embodiment, the MSs 404 and 402 may have ceased or paused D2D communication to allow this message 522 to occur. In various embodiments, this halt in D2D communication may be based upon the received resource allocation messages 520 and 521. In such an embodiment, the resource blocks not allocated to the MSs 402 and 404 may be employed for D2D communication between the MSs 402 and 404. In one embodiment, a D2D transmission gap may occur during the allocated resource period, as described above.

Action 524 illustrates that, in one embodiment, once the allocated resource period or block has occurred the MS 402 may switch back to a D2D mode and the two devices (MS 402 and 404) may resume their D2D communication. It is understood that the above merely represents a simple UL case and other communication cases (e.g., DL, a greater plurality of D2D MSs or members, etc.) are possible and within the scope of the disclosed subject matter.

Figure 6:
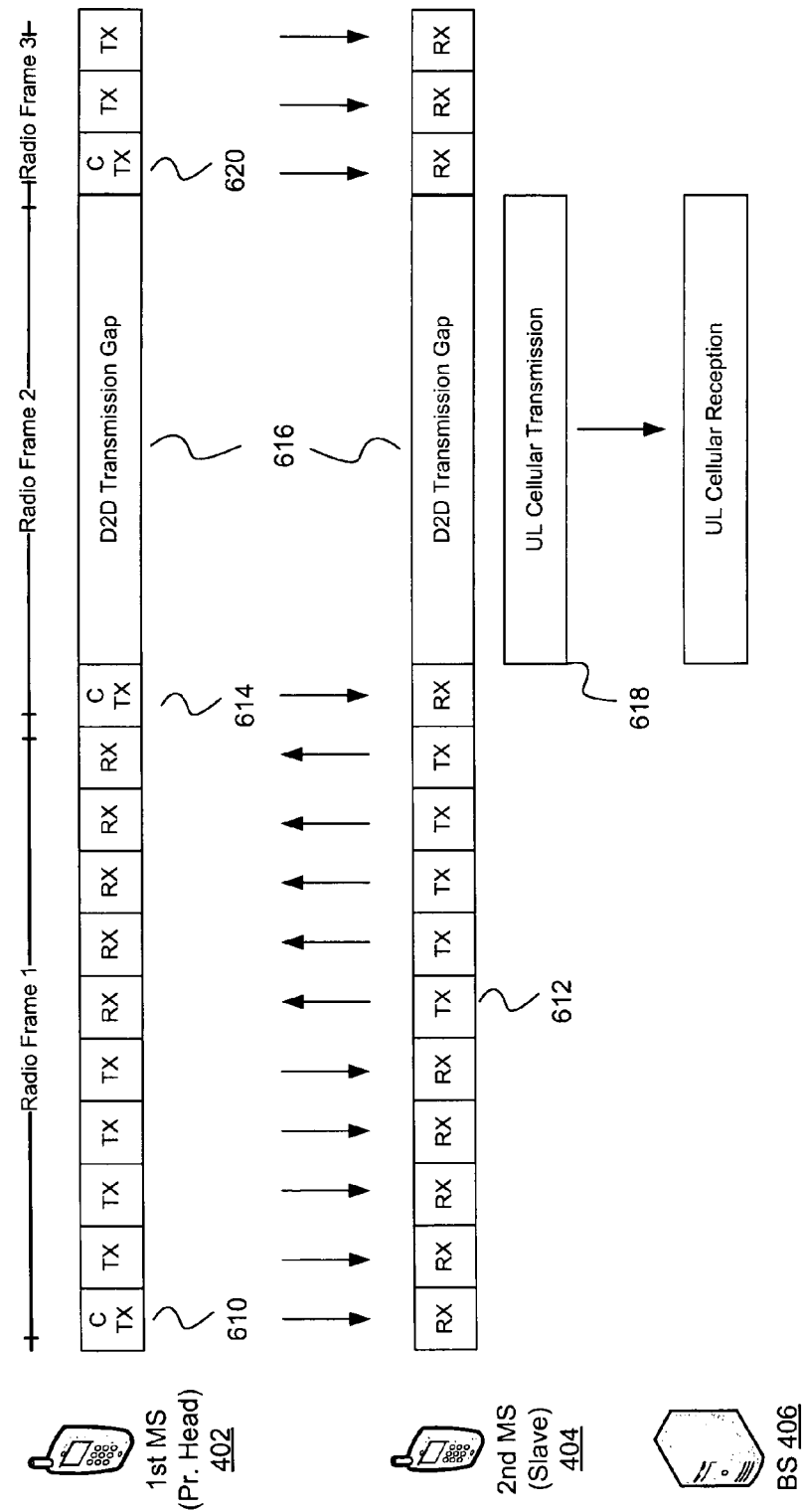
FIG. 6 is a timing diagram of an example embodiment of a system in accordance with the disclosed subject matter.

FIG. 6 is a timing diagram of an example embodiment of a system 600 in accordance with the disclosed subject matter. In one embodiment, the system 600 may include a first or pair head MS 402, a second, member or slave MS 404 and a BS 406. A visual representation of D2D communication, a D2D transmission gap period and cellular communication is illustrated. While (due mostly to space restrictions) FIG. 6 does not illustrate every message shown in FIG. 5 a few relevant messages are highlighted, and may aid in the understanding of FIG. 5 and the disclosed subject matter in general.

FIG. 6 illustrates a frame based communications protocol; although, it is understood that the above is merely one illustrative example to which the disclosed subject matter is not limited. The arrows illustrate the direction of user data transmission between the devices.

Figure 8:
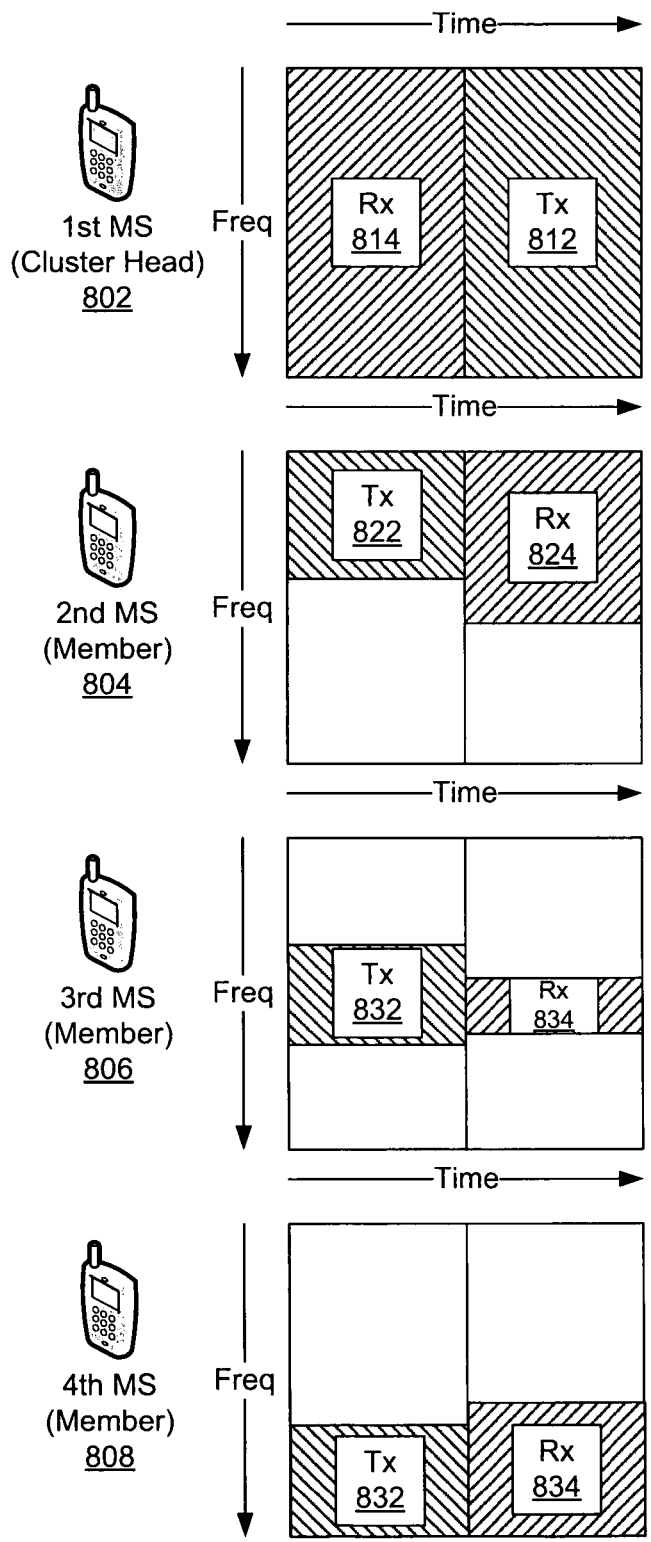
FIG. 8 is a block diagram of an example embodiment of a system in accordance with the disclosed subject matter.

In one embodiment, the pair head MS 402 may transmit D2D control information during the first sub-frame 610 or at least one sub-frame of each frame. In various embodiments, this D2D control information may include allocations of sub-frames for D2D transmission (Tx, or D2D UL), sub-frames for D2D reception (Rx, or D2D DL), and D2D transmission gap periods. In various embodiments, this control information may be rather simple for a pair of D2D MSs (e.g., MS 402 and 404). In another embodiment, clusters of D2D devices including more than two devices may include more complex information, as each device or device group may receive D2D resource allocations, as illustrated by FIG. 8. In various embodiments, the control information or allocations may be dynamic or semi-persistent. FIG. 6 illustrates a mostly static D2D arrangement.

Sub-frame 612 illustrates that, in one embodiment, the MS 404 may request a D2D transmission gap, as described above. In some embodiments, the request may include a time when the D2D transmission gap is desired, for how long it is desired (e.g., the number of frames or sub-frames, milliseconds, etc.), why it is desired, etc. In various embodiments, the MS 402 may not be able to instantly respond, for example as the remaining sub-frames in the frame have been allocated for MS 404 transmission. In another embodiment, a quicker more dynamic response protocol may be employed.

In one embodiment, the pair head MS 402 may signal or indicate during sub-frame 614 that the requested D2D transmission gap is occurring. In another embodiment, the MS 402 may indicate when (and what frequency) the D2D transmission gap will occur. The D2D transmission gap 616 may occur for a predetermined period of time. In another embodiment, the D2D transmission gap 616 may occur until the pair head MS 402 indicates the end of the D2D transmission gap 616. In yet another embodiment that include three or more D2D devices in the cluster, the D2D transmission gap period 616 may only apply to communication with MS 404 (e.g., MS 402 to third D2D device (not illustrated) may continue).

During the quieted D2D transmission gap period 616, the MS 404 may switch to a cellular communication mode. In such an embodiment, the MS 404 may perform a UL (or DL) cellular transmission 618, as described above.

In various embodiments, the MS 402 may signal the end of D2D transmission gap via sub-frame 620. In another embodiment if the length of the D2D transmission gap 616 is deterministic, the sub-frame 620 may merely include normal D2D control information, such as that illustrated by sub-frame 610. Although, it is understood that the above are merely a few illustrative examples to which the disclosed subject matter is not limited.

It is understood that, in various embodiments, a D2D transmission gap may be created, formally or informally, as a result of the cellular resource allocations assigned to the MSs 402 and 404 by the BS 406, as described above. In such an embodiment, the pair or cluster head MS 402 may formally transmit a D2D transmission gap start message (e.g., as illustrated by sub-frame 614). In another embodiment, the MSs 402 and 404 may simply, via the cellular resource allocations, know to refrain from performing D2D communication during given sub-frames, and thus informally create a D2D transmission gap.

Figure 7:
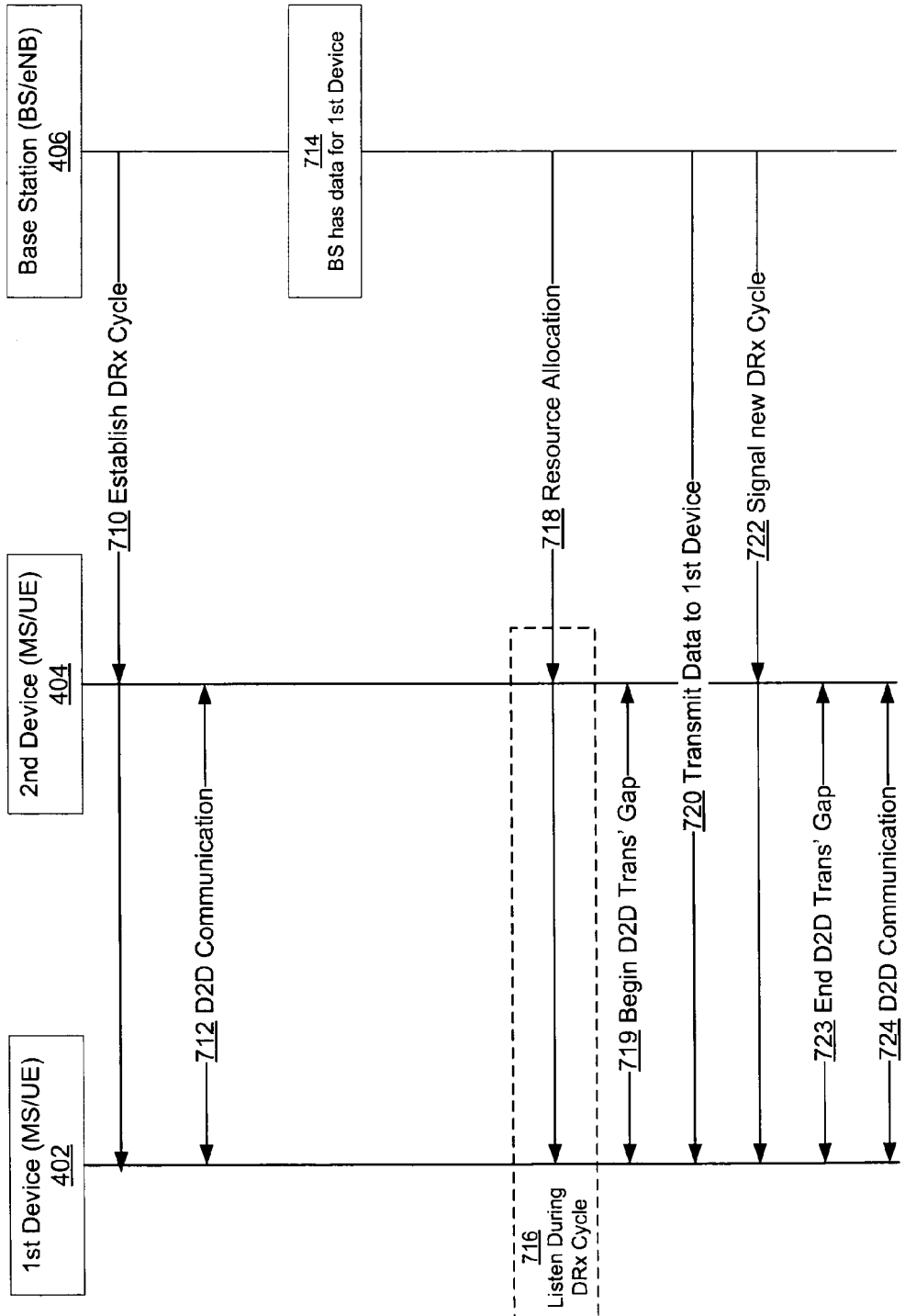
FIG. 7 is a block diagram of an example embodiment of a system in accordance with the disclosed subject matter.

FIG. 7 is a block diagram of an example embodiment of a system 700 in accordance with the disclosed subject matter. In one embodiment, the system 700 may include a first device (e.g., a MS, UE, etc.) 402, a second device (e.g., a MS, UE, etc.) 404, and a base station (e.g., a BS, a relay station, an eNB, etc.) 406. It is understood that while only two devices (devices 402 and 404) are illustrated, the disclosed subject matter is not limited to only two devices and a plurality of devices may be included in the system 400 or in the D2D communication network. Further, it is understood, that these devices may belong to more than one D2D network.

FIG. 7 illustrates an embodiment in which discontinuous communication is employed. While only discontinuous reception is illustrated, it is understood that this is merely one example and discontinuous transmission may occur instead or in addition to discontinuous reception and the disclosed subject matter is not limited to this example embodiment.

In this context, discontinuous communication includes discontinuous transmission (DTx) and/or discontinuous reception (DRx). In various embodiments, an MS may wish to only occasionally communicate with the cellular network (e.g., to save power, or allow for D2D communication, etc.). In such an embodiment, the MS may enter a discontinuous communications mode in which the MS is inactive or asleep (from the point of view of the cellular network) for a relatively long period of time, and then active or awake for a far shorter period of time. In various embodiments, the duty cycle and period in which the MS switches between active and inactive modes may be predetermined or dynamically assigned. In some embodiments, the duty cycle and period may be dictated by the MS or the BS. In this context, the term "discontinuous transmission/reception cycle" includes both the duty cycle and period of these active and inactive modes.

In various embodiments, a default maximum DRx/DTx period of 2.5 ms may be used during D2D communication. In another embodiment, a default active period may include one sub-frame or time transmission interval (TTI). In such an embodiment, the D2D may be available to spend most of their time involved in D2D communication. Although, it is understood that the above is merely one illustrative example to which the disclosed subject matter is not limited.

In one embodiment, the BS 406 may establish a DRx cycle for the MSs (MSs 402 and 404) included in the D2D cluster via a DRx establishing message 710. In various embodiments, the establishment may be initiated by the MSs 402 and 404. In various embodiments, establishment may include one or messages transmitted between the respective MSs and the BS 406. It is understood that the term "establish" and its variations includes only actions performed by the claimed device during any such establishment.

In various embodiments, by default the BS 406 may assign the same DRx cycle to every device in the same D2D cluster (e.g., MSs 402 and 404). In various embodiments, if there are devices from other cells or associated with other BSs in the cluster, they may ask their respective BS to adjust the DRx cycle. In some embodiments, in case of conflict the shortest DRx cycle may be used for the whole D2D cluster.

In another embodiment, the DRx cycle followed by the cluster or pair head (e.g., MS 402) may be the controlling factor in case of conflicts. In various embodiments, the cluster head MS 402 may propagate this DRx cycle parameters or settings throughout the D2D cluster.

Alternatively, in another embodiment, all devices in the same D2D cluster and served by the same BS (e.g., MSs 402 and 404) may detect a resource allocation for other devices in the same D2D cluster. In this case, the BS 406 may provide a list of all the MS identities to the devices in the same D2D cluster. Because, in such an embodiment, the grants may be addressed by masking error checking (CRC) words with node identifiers (e.g., CRNTIs in the LTE standard, etc.), checking simultaneously grants for the listed MSs may not mean additional decoding load but simply one XOR operation of the length of CRNTI for each listed MS identity. Although, it is understood that the above is merely one illustrative example to which the disclosed subject matter is not limited.

Action 712 illustrates that, in one embodiment, the MSs 402 and 404 may perform D2D communication, as described above. In an embodiment including discontinuous communication (DTx and/or DRx), this D2D communication may occur when the MSs 402 and 404 are in an inactive state or mode (and therefore, not in communication with the cellular network). In such an embodiment, D2D communication may be periodically interrupted, based upon the DRx/DTx cycle, when the MS (e.g., MS 402 or 404) enters or is in an active mode or state (and therefore, in or available for communication with the cellular network). In various embodiments, this periodic interruption may include a formal or informal D2D transmission gap, as described above.

Action 714 illustrates that, in one embodiment, the BS 406 may have data to be transmitted to the first device MS 402. In such an embodiment, the BS 406 may hold or refrain from transmitting the data until a time in which the MS 402 is expected to be in an active state. In another embodiment, the DRx protocol may indicate that the MS 402 is guaranteed or expected to be active to listen to a resource allocation at a given time, and then may continue to be active for a frame (or similar time unit) if a resource allocation is made to the MS 402, but that the MS 402 may return to an inactive state if no resource allocation to it is made. In such an embodiment, the MS 402's active period may occur once every X frames (e.g., every $10^{th}$ frame, etc.). Although, it is understood that the above is merely one illustrative example to which the disclosed subject matter is not limited.

In one embodiment, during the MSs 402 and 404 active periods in the DRx cycle, they may listen (as illustrated by Action 716) to a resource allocation message or broadcast 718 from the BS 406. In one embodiment, if no resource allocation is made to the MSs 402 and 404, they may reenter their inactive states (with respect to the cellular network) and continue D2D communication until their next active period of their DRx cycles.

However, in the illustrated embodiment, the BS 406 has data for the MS 402 and the resource allocation message 718 may indicate such. In such an embodiment, Action 719 illustrates that the MSs 402 and 404 may enter or begin a D2D transmission gap, either formally or informally, as described above. In one embodiment, the BS 406 may transmit data to the MS 402 via the DL data message 720.

In various embodiments, the BS 406 may wish to alter the parameters (e.g., duty cycle, period, etc.) of the DRx (or DTx) cycle. In such an embodiment, the BS may define a shorter (or longer) DRx cycle for the D2D cluster (MSs 402 and 404), via message 722, to enable a continuation of the D2D transmission even when MS 402 continues to receive cellular data. In such an embodiment, the BS 406 allow D2D and cellular communication to MS 402 to be interleaved, as opposed to fully occupying the MS 402 with only cellular communication.

Again a special case or embodiment may occur when the D2D cluster includes devices that are not within the coverage of the BS 406 that serves MS 402 (e.g., devices in another cell, out of coverage area, etc.), as described above. In this case, the MS 402 may inform these devices about its updated DRx cycle. During the active period the D2D transmissions may be suspended and after the active DRx period ends, the MS 402 may inform the other cluster members that D2D communication (at least with MS 402) may commence.

For example, a BS 406 may reserve 5 time transmission intervals (TTIs) after the end of the active period to allow MS 402 to inform the other devices (e.g., a third out-of-range MS) of the D2D cluster. Further, in one embodiment involving a long transmission time or large amount of cellular data, the BS 406 may reserve 5 TTIs every 100 ms for the MS 402 to inform, via D2D communication, the other cluster members that the cellular transmission is still ongoing. Although, it is understood that the above is merely one illustrative example to which the disclosed subject matter is not limited.

Action 723 illustrates that, in one embodiment, once the cellular transmission has ended the D2D transmission gap may end. As described above, this process including actions/messages 719, 720, 722, and 723 may repeat a number of times if needed or convenient. Action 724 illustrates that, in one embodiment, at some point the D2D communication may return to the steady state also illustrated by action 712, and the process illustrated by FIG. 7 may repeat in whole or part.

FIG. 8 is a block diagram of an example embodiment of a system 800 in accordance with the disclosed subject matter. In one embodiment, the system 800 may include a plurality of devices in D2D communication. In the illustrated embodiment, the system 800 may include a first device or cluster head 802, a second member device 804, a third member device 806, and a fourth member device 808.

In such an embodiment, the cluster head 802 may allocate D2D resources amongst the D2D cluster members 802, 804, 806, and 808. In various embodiments, the resource allocation may be highly static or unlikely to change between frames.

In one embodiment, the resources between the cluster members 802, 804, 806, and 808 may be divided in time, frequency or code multiplexing fashion or a combination thereof (e.g., time division multiple access (TDMA), frequency division multiple access (FDMA), code division multiple access (CDMA)) by allocating certain slots, sub-frames, or half frames, etc. for transmission. In such an embodiment, the slot allocation can be handled by the cluster head 802. Some services or embodiments may require highly asymmetric allocation of transmission slots inside the radio frame or other ITT. In various embodiments, the cluster head 802 may be able to configure the allocations dynamically in the control part of the frame. The control part of the frame may also include configuration information regarding the resource allocations for the next number of radio frames, as described above.

However a cluster may not be required to have a cluster head, in one embodiment. Resource multiple access and cellular access during D2D communication may also be handled, in various embodiments, in a distributed manner or may be handled in a centralized way by a BS.

FIG. 8 illustrates an Orthogonal Frequency-Division Multiple Access (OFDMA) allocation scheme. In such an embodiment, the cluster head 802 may receive D2D communication during period 814 and transmit during period 812. Conversely, the second member 804 may transmit via the OFDMA symbols and time indicated by period 822, and receive via the OFDMA symbols and time indicated by period 824. Likewise, the third member 806 may transmit via the OFDMA symbols and time indicated by period 832, and receive via the OFDMA symbols and time indicated by period 834. Finally, the fourth member 808 may transmit via the OFDMA symbols and time indicated by period 842, and receive via the OFDMA symbols and time indicated by period 844. Although, it is understood that the above is merely one illustrative example to which the disclosed subject matter is not limited.

In some embodiments, the cluster head 802 may be responsible for allocating more complex resource allocations, for example similar to that illustrated in FIG. 6 but with all four cluster members. As described above, a D2D transmission gap may, in one embodiment, only effect or pertain to communication with a single member of a cluster (e.g., only member 806), and other D2D communication may be allowed (e.g., between members 804 and 808) during the D2D transmission gap. In another embodiment, all or substantially all D2D communication may halt during a D2D transmission gap. In yet another embodiment, multiple cluster members may be affected by a plurality of D2D transmission gaps, for example two members may be independently communicating with a BS.

In various embodiments, a single D2D device may be part of several D2D clusters. For example, a smart-phone MS may communicate substantially independently with a headset MS (an audio or telephone data based D2D cluster) and a television MS (a video based D2D cluster); although, it is understood that the above is merely one illustrative example to which the disclosed subject matter is not limited. In such an embodiment, DTx cycles may be used to coordinate the presence of a single device in multiple clusters. For example, the second device 804 might be present every even sub-frame in the cluster illustrated by FIG. 8 and every odd slot in another (un-illustrated) cluster. In case of conflicts (several devices in cellular transmission and/or other clusters) the cluster head will coordinate the DTx cycles. The devices with a conflicting DTx cycle will then try to renegotiate with their serving BS or cluster heads of other clusters a new non-conflicting DTx cycle.

In such an embodiment, the renegotiation or initialization of the DRx/DTx scheme may include receiving a message from the cluster head setting a DRx/DTx cycle. In various embodiments, the scheme may further include a confirmation or acceptance message acknowledging that the new DRx/DTx cycle does not produce any conflicts. In various embodiments, this message may include a proposed or counter-offer for a newer DRx/DTx scheme that reduces communication issues.

FIG. 9 is a flow chart of an example embodiment of a technique 900 in accordance with the disclosed subject matter. In various embodiments, the technique 900 may be performed by the system of FIG. 1, 2, 4, 5, 6, 7 or 8, the apparatus of FIG. 3, as described above.

Block 902 illustrates that, in one embodiment, a first apparatus (e.g., a mobile station, etc.) may communicate with at least a second apparatus via a device-to-device communication link, as described above. In some embodiments, this communication may occur via a wireless link, as described above. In various embodiments, the action(s) illustrated by this block may be performed by the MSs of FIG. 1, 2, 4, 5, 6, 7 or 8 or the transceiver 302 of FIG. 3, as described above.

Block 904 illustrates that, in one embodiment, the first apparatus may employ at least two discontinuous communication schemes to multiplex communicating with a first device-to-device cluster that includes both the first and second apparatuses and communicating with a second device-to-device cluster that includes the first apparatus and a third apparatus, as described above. In one embodiment, the first apparatus may communicate with first cluster during even sub-frames and the second cluster during odd sub-frames, as described above. In various embodiments, a discontinuous communication schemes may include DRx, DTx, or a combination thereof. In various embodiments, the action(s) illustrated by this block may be performed by the MSs of FIG. 1, 2, 4, 5, 6, 7 or 8 or the transceiver 302 of FIG. 3, as described above.

Block 906 illustrates that, in one embodiment, the first apparatus may receive resource allocations, from a base station, as described above. In various embodiments, receiving may include, if the first apparatus is unable to communicate with the base station, receiving a transmission from the second apparatus indicating which, if any, resources where allocated, by the base station, to the second apparatus for communication with the base station, as described above.

In some embodiments, receiving may include coordinating apparatus-to-base station communication via discontinuous communication cycles, as described above. In such an embodiment, a discontinuous communication cycle may include an active period in which the first apparatus is configured to perform apparatus-to-base station communication, and an inactive period in which the first apparatus is not configured to perform apparatus-to-base station communication, as described above. In various embodiments, coordinating may include receiving, from a base station, a message altering the period of the discontinuous communication cycles, as described above. In another embodiment, coordinating may include setting a substantially identical discontinuous communication cycle for both the first apparatus and the second apparatus, and, in one embodiment, transmitting, by the first apparatus, a message to the base station requesting that the period of the discontinuous communication cycles be altered to a proposed period, as described above. In various embodiments, a discontinuous communication schemes may include DRx, DTx, or a combination thereof. In various embodiments, the action(s) illustrated by this block may be performed by the MSs of FIG. 1, 2, 4, 5, 6, 7 or 8 or the transceiver 302 or processor 304 of FIG. 3, as described above.

Block 907 illustrates that, in one embodiment, the apparatus may determine, based at least partly on the received resource allocations, which resources are allocated to at least the second apparatus for communication with the base station, as described above. In various embodiments, the action(s) illustrated by this block may be performed by the MSs of FIG. 1, 2, 4, 5, 6, 7 or 8 or the transceiver 302 or processor 304 of FIG. 3, as described above.

Block 908 illustrates that, in one embodiment, the first apparatus may, based at least partially upon the resource allocations, determine when to perform direct device-to-device communication, by the first apparatus, with the second apparatus, as described above. In various embodiments, this may include the arrangement of a D2D transmission gap, as described above. In various embodiments, the action(s) illustrated by this block may be performed by the MSs of FIG. 1, 2, 4, 5, 6, 7 or 8 or the processor 304 of FIG. 3, as described above.

Block 910 illustrates that, in one embodiment, the first apparatus may communicate, with the second apparatus, via at least a portion of the resources not allocated to the second apparatus by the base station, as described above. In various embodiments, the action(s) illustrated by this block may be performed by the MSs of FIG. 1, 2, 4, 5, 6, 7 or 8 or the transceiver 302 of FIG. 3, as described above.

Block 912 illustrates that, in one embodiment, the first apparatus may arrange a device-to-device transmission gap such that either the first apparatus or the second apparatus may communicate with the base station, as described above. In various embodiments, the transmission gap may include a period of time in which no user data direct device-to-device communication occurs between the first apparatus and the second apparatus, as described above. In various embodiments, arranging may include a response to the resource allocation of Block 906, as described above. In another embodiment, arranging may include receiving a request to create a transmission gap, as described above. In one embodiment, arranging may include receiving, by the first apparatus, a transmission gap request message from the second apparatus, and, in one embodiment, indicating to the second apparatus what communication resources are allocated for the device-to-device transmission gap, as described above.

In various embodiments, the first apparatus may also be in D2D communication with a third apparatus (or more). In such an embodiment, technique 900 or arranging may include communicating, by the first apparatus, with the third apparatus via a device-to-device communication link during the device-to-device transmission gap, and not communicating, by the first apparatus, with the second apparatus during the device-to-device transmission gap, as described above. In various embodiments, the action(s) illustrated by this block may be performed by the MSs of FIG. 1, 2, 4, 5, 6, 7 or 8 or the transceiver 302 or processor 304 of FIG. 3, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described herein, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, the apparatus or devices described herein (e.g., the first mobile station 402, the second mobile station 404, the base station 406, cluster head 802, etc.) may refer to a group of integrated circuits (ICs) or a chipset which is configured to operate in a wireless system. It is understood that the above are merely a few illustrative examples to which the disclosed subject matter is not limited.

Furthermore, various embodiments have been described by using LTE terminology. It is understood that the embodiments described herein are merely a few illustrative examples to which the disclosed subject matter is not limited. Various embodiments of the disclosed subject matter may be implemented or applied to other wireless systems or networking protocols (e.g., WiMAX, WMAN, 4G cellular networks, etc.). In various embodiments, these wireless systems may include, for example, access points instead of base stations, and terminals, stations or the like instead of mobile stations; although, it is understood that the above are merely a few illustrative examples to which the disclosed subject matter is not limited.

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:
1. A method comprising:
communicating, by a first apparatus, with at least a second apparatus via a device-to-device communication link;
receiving, at the first apparatus, resource allocations, from a base station;
determining, at the first apparatus, based at least partly on the received resource allocations, which resources are allocated to at least the second apparatus for communication with the base station; and based at least partly upon the resource allocations, determining, at the first apparatus, when to perform direct device-to-device communication, by the first apparatus, with the second apparatus.

2. The method of claim 1 further including:
communicating, with the second apparatus, via at least a portion of the resources not allocated to the second apparatus by the base station.

3. The method of claim 1 further including:
arranging a device-to-device transmission gap such that either the first apparatus or the second apparatus may communicate with the base station; and
wherein the transmission gap includes a period of time in which no device-to-device user data communication occurs between the first apparatus and the second apparatus.

4. The method of claim 3 wherein arranging includes:
receiving, by the first apparatus, a transmission gap request message from the second apparatus; and
indicating to the second apparatus what communication resources are allocated for the device-to-device transmission gap.

5. The method of claim 3 wherein the device-to-device transmission gap facilities the second apparatus communicating with the base station; and
further including:
communicating, by the first apparatus, with a third apparatus via a device-to-device communication link during the device-to-device transmission gap, and
not communicating, by the first apparatus, with the second apparatus during the device-to-device transmission gap.

6. The method of claim 1 wherein receiving resource allocations includes:
coordinating apparatus-to-base station communication via discontinuous communication cycles;
and wherein a discontinuous communication cycle includes:
an active period in which an apparatus is configured to perform apparatus-to-base station communication, and
an inactive period in which the apparatus is not configured to perform apparatus-to-base station communication.

7. The method of claim 6 wherein coordinating includes:
receiving, from a base station, a message altering the period of the discontinuous communication cycles.

8. The method of claim 6 wherein coordinating includes:
setting a substantially identical discontinuous communication cycle for the first apparatus and the at least a second apparatus; and
transmitting, by the first apparatus, a message to the base station requesting that the period of the discontinuous communication cycle be altered to a proposed period.

9. The method of claim 1 wherein receiving resource allocations includes:
if the first apparatus is unable to communicate with the base station, receiving a transmission from the second apparatus indicating which, if any, resources where allocated, by the base station, to the second apparatus for communication with the base station.

10. The method of claim 1 wherein the first apparatus and the second apparatus are included in a first device-to-device communication cluster;
wherein the first apparatus and a third apparatus are included in a second device-to-device communication cluster; and
further including:
employing, by the first apparatus, at least two discontinuous communication schemes to multiplex communicating with the first device-to-device cluster and communicating with the second device-to-device cluster.

11. A first apparatus comprising:
a receiver configured to:
receive signals from at least a second apparatus via a device-to-device communication link, and
receive resource allocations, from a base station;
a transmitter configured to:
transmit signals to at least the second apparatus via a device-to-device communication link; and
a processor configured to:
determine, based at least partly on the received resource allocations, which resources are allocated to at least the second apparatus for communication with the base station, and
determine, based at least partially upon the received resource allocations, when to perform direct device-to-device communication with the second apparatus.

12. The apparatus of claim 11 wherein the transmitter is further configured to:
transmit signals, to the second apparatus, via at least a portion of the resources not allocated to the second apparatus by the base station.

13. The apparatus of claim 11 wherein the processor is further configured to:
arrange a device-to-device transmission gap such that either the first apparatus or the second apparatus may communicate with the base station; and
wherein the transmission gap includes a period of time in which substantially no device-to-device user data communication occurs between the first apparatus and the second apparatus.

14. The apparatus of claim 13 wherein the receiver is configured to receive a transmission gap request message from the second apparatus; and
wherein the transmitter is configured to indicate to the second apparatus what communication resources are allocated for the device-to-device transmission gap.

15. The apparatus of claim 13 wherein the device-to-device transmission gap facilities the second apparatus communicating with the base station; and
wherein the apparatus is configured to:
communicate with a third apparatus via a device-to-device communication link during the device-to-device transmission gap, and
not communicate with the second apparatus during the device-to-device transmission gap.

16. The apparatus of claim 11 wherein the processor is configured to:
coordinate apparatus-to-base station communication via discontinuous communication cycles; and
wherein a discontinuous communication cycle includes:
an active period in which an apparatus is configured to perform apparatus-to-base station communication, and
an inactive period in which the apparatus is not configured to perform apparatus-to-base station communication.

17. The apparatus of claim 16 wherein the receiver is configured to:
receive, from a base station, a message altering the period of the discontinuous communication cycles.

18. The apparatus of claim 16 wherein the receiver is configured to receive a message setting an identical discontinuous communication cycle for the first mobile station and the at least a second mobile station; and wherein the transmitter is configured to transmit a message to the base station requesting that the period of the discontinuous communication cycle be altered to a proposed period.

19. The apparatus of claim 11 wherein the receiver is configured to:
  if the first apparatus is unable to communicate with the base station, receive a transmission from the second apparatus indicating which, if any, resources where allocated, by the base station, to the second apparatus for communication with the base station.

20. The apparatus of claim 11 wherein the first apparatus and the second apparatus are included in a first device-to-device communication cluster;
  wherein the first apparatus and a third apparatus are included in a second device-to-device communication cluster; and
  wherein the processor is configured to:
    employ at least two discontinuous communication schemes to multiplex communicating with the first device-to-device cluster and communicating with the second device-to-device cluster.

21. A computer program product, comprising a non-transitory computer usable medium having a computer readable program code embodied therein, said computer readable program code adapted to be executed to implement a method for device-to-device communication, said method comprising:
  communicating, by a first apparatus, with at least a second apparatus via a device-to-device communication link;
  receiving resource allocations, at the first apparatus, from a base station;
  determining, at the first apparatus, based at least partly on the received resource allocations, which resources are allocated to at least the second apparatus for communication with the base station; and
  based at least partly upon the resource allocations, determining, at the first apparatus, when to perform direct device-to-device communication, by the first apparatus, with the second apparatus.

\* \* \* \* \*